(12) United States Patent
Os et al.

(10) Patent No.: US 7,397,587 B2
(45) Date of Patent: Jul. 8, 2008

(54) FAST, AUTO-CROPPING, BI-DIRECTIONAL MULTI-RESOLUTION SCANNER APPARATUS, SYSTEM AND SOFTWARE THEREFOR

(75) Inventors: Ron Os, Morrison, CO (US); John Blair, San Ramon, CA (US)

(73) Assignee: Visioneer, Inc., Morrison, CO (US)

( * ) Notice: Subject to any disclaimer, the term of this patent is extended or adjusted under 35 U.S.C. 154(b) by 0 days.

(21) Appl. No.: 11/532,022

(22) Filed: Sep. 14, 2006

(65) Prior Publication Data

US 2007/0013980 A1 Jan. 18, 2007

Related U.S. Application Data

(63) Continuation of application No. 09/956,373, filed on Sep. 17, 2001, now abandoned.

(60) Provisional application No. 60/239,652, filed on Oct. 11, 2000, provisional application No. 60/233,528, filed on Sep. 19, 2000.

(51) Int. Cl.
*H04N 1/04* (2006.01)
*H04N 1/387* (2006.01)
*H01L 27/00* (2006.01)

(52) U.S. Cl. .................. 358/474; 358/497; 358/453; 250/208.1

(58) Field of Classification Search ............. 358/474, 358/497, 453; 250/208.1
See application file for complete search history.

(56) References Cited

U.S. PATENT DOCUMENTS

| 4,837,635 | A | 6/1989 | Santos |
| 5,223,954 | A | 6/1993 | Miyakawa et al. |
| 5,283,657 | A | 2/1994 | Ichikawa et al. |
| 5,301,244 | A | 4/1994 | Parulski |
| 5,805,294 | A | 9/1998 | Furuoya |
| 5,880,858 | A | 3/1999 | Jin |
| 6,388,778 | B1 | 5/2002 | Ko-Chien |
| 6,650,442 | B1 * | 11/2003 | Chiu .................. 358/474 |
| 6,657,753 | B2 * | 12/2003 | Shiota et al. .......... 358/487 |

* cited by examiner

*Primary Examiner*—Houshang Safaipour
(74) *Attorney, Agent, or Firm*—Dorsey & Whitney LLP

(57) ABSTRACT

Bi-directional multi-resolution scanner having software/firmware for 1- to 2-pass high resolution scanning, enabling the scanner to capture and render image data both the standard direction, top to bottom pass, as well as the return direction, that is, bi-directional scanning, in contrast to prior art scanners which return to the start position after each pass without reading (scanning). Typical current B&W scanning of an 8½×11" image at 600 dpi takes a total time from start to reload to the next image of on the order of 42-67 seconds. In contrast, the inventive system scans and displays the high resolution image in about 37 seconds, some 7-30 seconds faster than a conventional scanner. In multiple image scanning, since the time for the two return passes and the preview pass is eliminated, the productivity is increased from 20 to 300% or more. Since multiple non-scan return passes are eliminated, the inventive system is also a substantial improvement for limited power bus devices.

10 Claims, 3 Drawing Sheets

Invention - Bi-Directional Scanning

Prior Art Cropping

Invention - Bi-Directional Scanning

FAST, AUTO-CROPPING, BI-DIRECTIONAL MULTI-RESOLUTION SCANNER APPARATUS, SYSTEM AND SOFTWARE THEREFOR

CROSS REFERENCE TO RELATED APPLICATIONS

This application is a Continuation of U.S. patent application Ser. No. 09/956,373 filed Sep. 17, 2001 now abandoned and entitled FAST, AUTO-CROPPING, BI-DIRECTIONAL MULTI-RESOLUTION SCANNER APPARATUS, SYSTEM AND SOFTWARE THEREFOR, which is related to Provisional Application Nos. 60/233,528 and 60/239,652 filed Sep. 19, 2000 and Oct. 11, 2000, respectively, by the same inventors, both of which applications are entitled FAST, AUTO-CROPPING, BI-DIRECTIONAL MULTI-RESOLUTION SCANNER APPARATUS, SYSTEM AND SOFTWARE THEREFOR, the priority of which are claimed under 35 USC § 119. The entire contents of the above-mentioned applications is incorporated herein by this reference.

FIELD OF THE INVENTION

The invention relates to apparatus and methods for image acquisition. More particularly, the invention is directed to the use of desktop image acquisition peripherals, primarily a bi-directional scanner mechanism to preview scan and simultaneously automatically crop images in a first pass at a low resolution, and scan images at high resolution in a second, return pass, to reduce the time necessary to convert images into digital data. Multiple images can be acquired without the scanner head returning to its home position between scans. The hardware and software of the invention shows particular utility in personal, home office, and small office applications or anywhere image acquisition and transfer is used.

BACKGROUND

The background of this invention involves digital scanners and software based methods. Presently, typical scanners provide very high optical resolutions and brilliant color depth. However, the superior imaging quality typically results in long scan times and slow imaging speeds.

The optical resolution of the images scanned by digital scanners is a function of the number of pixel capture sites (also called "photosites" or "pixels" in the electro mechanical sense) on the electro-mechanical sensor assembly in the scanner. Scanning is done in a Cartesian mode, i.e., a linear array of the pixel sites are mounted on a longitudinal bar; the bar is moved as a unit along a vertical path. Each pixel is a small area on the surface of the image sensor that captures the brightness of a single image area pixel of the image, with one scanner pixel for each image pixel in the digital image. In that way, the number of pixels on the scanner's image sensor bar determines the horizontal optical resolution. The distance the bar advances between acquisitions (also called "shots") determines the vertical resolution. For example, a scanner with a resolution of 600 dots per inch (dpi)×1200 dpi has 600 pixels on its sensor bar which moves $\frac{1}{1200}$ of an inch between each scan shot. Together, the horizontal and vertical resolutions constitute the optical resolution and determine the level of detail that the scanner can capture.

To increase the resolution of a scanner, the number of pixel sites on the scanner head (the "horizontal" or transversely aligned bar containing the linear array of CCD or CIS photosensitive elements) must be increased, the distance the scanner bar mechanism moves between acquisition shots (the "vertical" or longitudinal resolution) must be decreased, or some combination of the two. Current technology offers two basic types of pixels: CSI and CCD (other types of elements may become available in the future). There is a technological constraint on the horizontal resolution, which is determined by the number of pixels arrayed on the bar due to their physical size and how closely they can be positioned to one another. To increase the vertical resolution, digital scanners must move smaller and smaller distances between scans. Since the illumination lamp output changes over time, and the length of exposure depends on brightness and dpi, the scanner head is ordinarily calibrated from time to time (often at each scan) to control the length of pause for exposure at each acquisition shot. CSI element-containing scanner bars are typically slower as they require more light per exposure, and the slow down is more pronounced at low resolution.

Typical digital scanners today provide vertical optical resolutions of 1200 to 4800 dpi. Thus, the scanner mechanism moves $\frac{1}{1200}$ to $\frac{1}{4800}$ of an inch between each single line shot or scan. This process generates a large quantity of digital data (large image data file), which needs to be transferred to the host system (computer). Because of limitation in the communication speed with the hose, high-resolution scans take a long time, with typical scanners on the market presently taking two minutes or more to complete a single pass at the highest resolution for the full length of the scanner platen (typically 11.69"). Current CCD scanner bars employ around 3×10,400 pixels (the "3" refers to the colors R, G, B), and scanner bars having higher resolutions are within the scope of this invention. The net actual attainable resolution is not determined only by the pixel density, but in large part is determined by the optics of the scanner. For example, most scanners rated at "1200 dpi" resolution are limited to 600 dpi or less due to optical constraints.

The high-resolution scan is slower than preview scanning, the rate depending on the resolution. The scan bar moves at a speed proportional to the resolution, regardless of whether the image is in B&W, grayscale or color, and how fast the data can be transferred to the host. The scan speed is dependent on the resolution, color/ grayscale/B&W, and transfer-to-host speed, but is independent of the area of the image being scanned. That is, if nothing is on the platen, even though the scanner head sees "white", where high resolution is the selected scan mode, the scan speed is slower than if preview or low resolution is selected as the scan mode. Although some scanners may have a relatively fast return feature in which the non-scanning return to the start position is faster than scan, that return time is still wasted wait time. CIS heads are slower than CCD, and for large color photo images, the data files can be very large, with consequently slow transfer. For a CCD head scanning an 8½"×11" image on a standard 8.7×11.69" platen, the scan times are set forth in Table 1 below.

TABLE I

Scan Time at Various Resolutions

| Resolution, DPI | Scan Time in Seconds, for 8.5" × 11" Image | |
|---|---|---|
| | B & W | Color |
| 100 | 7 | 8 |
| 300 | 20 | 30 |
| 600 | 30 | 120 |

Return speed typically ranges from 3½ seconds to 15 seconds, depending on the scanning motor type and the return speed is set, not variable or programmable. CIS head return speeds are slower.

Image Cropping:

In order to reduce scanning time and to reduce file size, present scanner manufacturers allow users to either manually, or automatically, make a single, low resolution scan, e.g., at 72-100 dpi. An example of current cropping hardware and software technology is shown in Santos, U.S. Pat. No. 4,837,635 (Hewlett-Packard). The image created from the preview scan by the digital scanner is rectangular in shape and consists of an image of everything on the flatbed scanner, e.g., the document being scanned as well as all the blank space around that document. The software or firmware of the systems creates a low-resolution image, and either the user or an automatic cropping algorithm selects the desired region of the image. The user or cropping algorithm draws a box or "lasso" around the image and then transmit to the scanner the instruction to scan, at a high resolution, the area marked off by the crop box or lasso. While the user or cropping algorithm selects the region of the low-resolution image to rescan, the scanner bar returns to its normal starting position in order to prepare to make the next, high-resolution, scan, e.g., 300, 600, 1200 or more dpi. Cropping and B&W scanning reduces data transfer time, cropping because there is less total data, and B&W because it is 1 bit vs 24 bit data for color. With automatic cropping algorithms, the cropping action may take a fraction of a second, but currently available scanners take time for the scan bar to return to its starting position to begin the high-resolution scan.

A serious disadvantage of the present scanning/cropping technology arises from the number of passes that the scanner bar must take in order to acquire and render the final high-resolution, useable image on screen for saving to a data file. Typically, currently available scanners take 4 passes per image: 1) Low resolution preview/crop; 2) return; 3) high resolution acquisition scan; and 4) return. Where there are multiple images to acquire, this process takes a very long time, and adds significant cycle wear to the scanner hardware.

There is thus a significant need for a scanning system that automatically crops and acquires high resolution images in short, fast scanning cycles that permits faster through-put and reduced component cycle wear.

THE INVENTION

Summary, Including Objects and Advantages

The invention is directed to digital imaging devices, methods of image data acquisition, and driver software therefor. More particularly, the invention comprises a desktop flatbed digital image scanner apparatus and software that makes possible the complete previewing, calibration at both low and high resolution, cropping, high resolution scanning, and transfer of digital image data from a flatbed to a computer or saved onto memory media in significantly less time than present scanners.

The inventive apparatus comprises a desktop flatbed digital scanner that is capable of bi-directional multi-resolution scanning; i.e. scanning both on a first scan at a first, typically low, resolution as the scanning bar moves longitudinally along the platen, and also scanning at a second, typically high, resolution scan during the reverse or "return" movement longitudinally back to the initial position of the bar. The inventive system is also a substantial improvement for limited power, bus, USB, "Firewire", IEEE 1394, etc. devices.

As used herein the initial or "start" position of the scanning bar is considered by convention to be the "top", and the end of the bar movement, or "pass", is the bottom. The user ordinarily places the item (image or text document) on the glass platen of the scanner oriented with the top of the item at the end of the scanner platen designated as the top, which is where the bar starts. A "pass" constitutes the motion of the scanner bar (or relative motion of the item past a fixed, slit-masked, stationary head). Thus, the first pass comprises the relative motion of the bar the length of the platen from the top to the bottom, i.e. one-way. The second pass in currently available scanners is a reload or return to start or top, during which no scanning is done. In such conventional scanners, the third pass is the high-resolution scan, which pass is identical in direction (down the page/platen). In the inventive scanner, the return or second pass is the high-resolution scan. This defines the bi-directional, multi-resolution scanning attribute of the inventive scanner and its associated software.

The inventive scanner system comprises any suitable scanner bar with modified electronics, scanner firmware and software drivers that are enabled in accord with the principles disclosed herein, which scanner captures and reads image data both the standard direction as well as the return direction, that is bi-directional scanning. On the return pass, the software and hardware of the invention reads the image data and sends that data to the associated computer in reverse bit stream sequence, from the bottom of the image to the top of the image, although the image is displayed (rendered) oriented top up on screen. In this manner, the apparatus and software of the invention create a preview resolution scan for cropping on the first pass, automatically crops the image, and on the second pass creates a high resolution image of the cropped region while scanning on the return movement to the starting location.

The scanner apparatus and software system of the invention thus reduce the time necessary for scanning by reducing the overall distance the scanner bar must move. Typical scanners require the scanner bar to move from the starting location, to the end of the flatbed, back to the start, and again to the end of the flatbed to complete the high-resolution scan. At that point, the scanning is done, but the scanner bar must return to the starting location for the next image to scan, i.e. 4 passes to reload for the next item. Thus, present scanners need 4x passes per image, while the inventive scanner/software system only requires 2x for the first image, where x is the number of images to be scanned for the first image, and only single passes for subsequent similarly cropped images. The inventive system reduces the number of steps to a maximum of two: the scanner bar moves to the end of the flatbed and returns. The software of the invention reads the high-resolution image data on the $2^{nd}$ pass from the bottom of the image to the top and displays the final image in that order, much faster than present scanners do. For example, in current B&W scanning of an 8½×11" image at 600 dpi the total time from start to reload to the next image is on the order of from about 42-67 seconds. In contrast, in the inventive system the image is scanned and displayed in about 37 seconds, some 7-30 seconds faster than a conventional scanner. In multiple image scanning, since the time for the two return passes and the preview pass is eliminated the productivity is increased from 20 to 300% or more.

In an important option, the inventive scanning system can also crop automatically on the initial preview scan, or the cropping lasso can be set at the end of the first "downward" pass, and for the scanning of a number of subsequent similar and/or identical sized images, high resolution scan can be done on each subsequent pass, back to the top, second downward pass, etc. In this embodiment, Pass 1 (top to bottom) is preview and autocrop; Pass 2 (bottom to top) acquire document 1 (high resolution); Pass 3 ($2^{nd}$ top to bottom pass) acquire document 2 (high resolution); Pass 4 ($2^{nd}$ bottom to top) acquire document 3 (high resolution), etc. As compared to the prior art which requires 4 passes to acquire one document at high resolution, the inventive system can acquire 3 documents in the same number of passes, an improvement ratio of 3:1 (300%).

Likewise, when cropping is not required, the inventive scanner system can significantly reduce the time required to scan multiple documents. When a user wants to acquire a stack of x images, the scanner can acquire the first image on its pass from top to bottom, the second image from bottom to top and so on, reducing the wait for the scanner head to return home between scans. This dramatically increases productivity, especially on scanners with a limited power budget, e.g., buss powered devices (USB), wherein the lower power limits the return speed of the scanner head. For example a bus-powered USB scanner is limited to operation at about 500 mA, which is low for a stepper motor, so the scan speed is slower.

BRIEF DESCRIPTION OF THE DRAWINGS

The invention is described by reference to the drawings in which:

FIG. 2 illustrates the scan-bar movements necessary to create both a preview and high resolution image in a currently available conventional scanner, in which FIG. 2A is a hardware schematic, and FIG. 2B illustrates the software flow sheet and the corresponding scan head position during the operational steps; and FIG. 3 illustrates the method used by the inventive apparatus to complete a preview and final scan, in which FIG. 3A is a hardware schematic, and FIG. 3B illustrates the software flow sheet and the corresponding scan head position demonstrating that for the first image acquisition, only half the number of passes is required.

DETAILED DESCRIPTION, INCLUDING THE BEST MODE OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives, and uses of the invention. The description includes what are presently believed to be the best modes of carrying out the invention.

In this regard, the invention is illustrated in several figures (and tables where included), and is of sufficient complexity that the many parts, interrelationships, process steps, and sub-combinations thereof simply cannot be fully illustrated in a single patent-type drawing or table. For clarity and conciseness, several of the drawings show in schematic, or omit, parts or steps that are not essential in that drawing to a description of a particular feature, aspect or principle of the invention being disclosed. Thus, the best mode embodiment of one feature may be shown in one drawing, and the best mode of another feature will be called out in another drawing. Process aspects of the invention are described by reference to one or more examples or test runs, which are merely exemplary of the many variations and parameters of operation under the principles of the invention.

Figure 1:
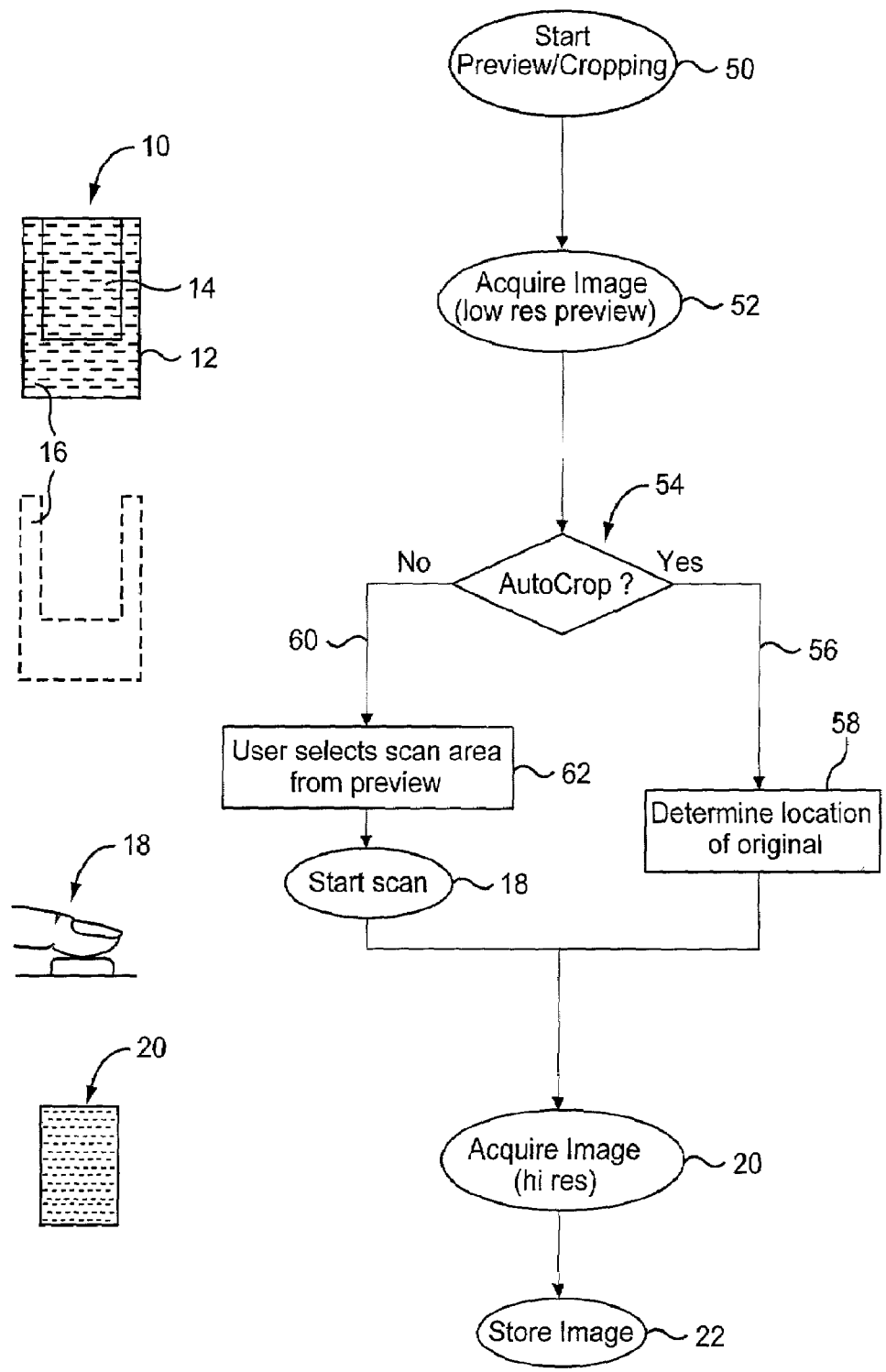
FIG. 1 illustrates the manual or automatic cropping steps required on typical scanners, including the corresponding software flow sheet.
Figure 2:
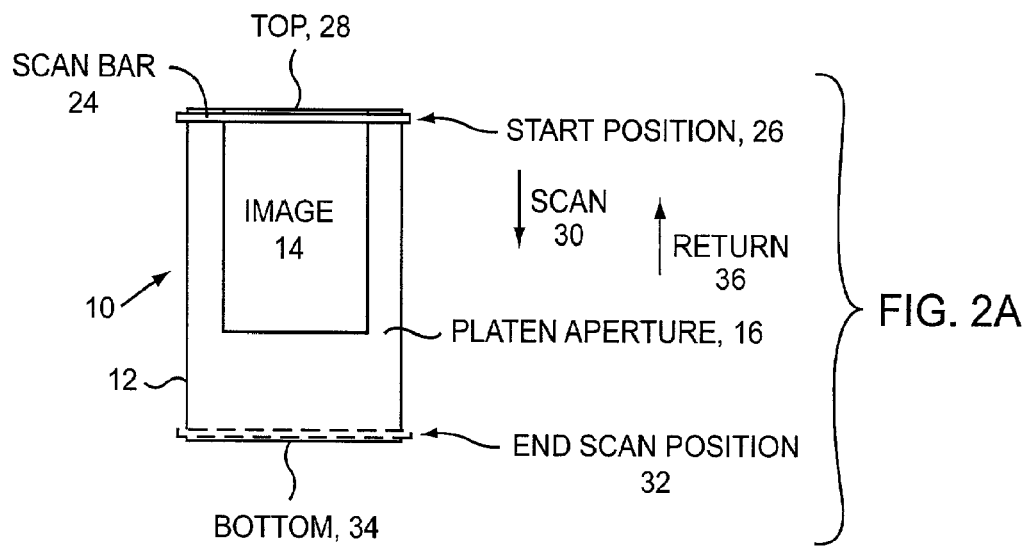
Figure 2:
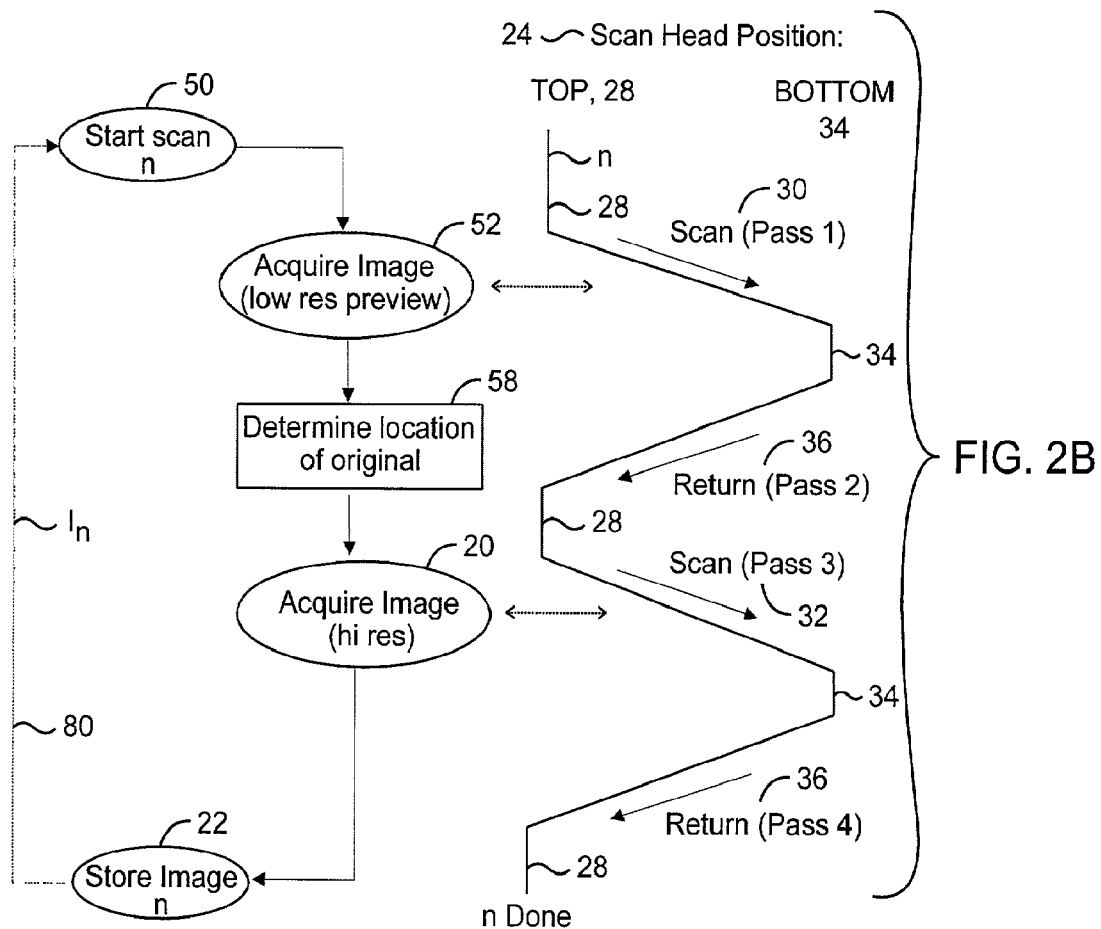

The hardware system of the invention comprises a desktop digital scanner with a scanner bar that scans in two directions. FIGS. 1 and 2 illustrate prior art operations of conventional scanners. FIG. 1 illustrates the manual or automatic preview/cropping steps of typical prior art scanners, followed by user-initiated high resolution scanning for acquisition and transfer to a computer or other memory media (such as disk and memory stick-type media). FIG. 2 illustrates the 4 passes (scan-bar movements) necessary to create both a preview and high resolution image in a typical scanner. In the example given, the return time is an average of 7.5 seconds, and the resolution is taken as 600 dpi.

In more detail, FIG. 1 shows the prior art preview, cropping and acquisition scanning, schematically on the left and in operational flow sheet format on the right, which includes the software/firmware interaction with the user for manual cropping selection. The upper left schematic schematically shows scanner system 10 comprising a scanner platen 12 on which is placed an image document 14 which is to be acquired and rendered, e.g., on the display screen of a computer (not shown). The widely spaced dashed lines represent the low resolution scan of the entire platen. When the user initiates a preview scan 50, the entire flatbed area 12 is scanned in 24-bit color at low resolution, typically 72-100 dpi, representing the acquisition of the image 52. The real-time preview image 10 of the scanned data is displayed on the computer screen (not shown). The preview image 10 includes both the image area 14 and the remaining blank or "white" area 16, and is typically not saved on the computer hard drive. If the user has selected auto crop 54, 56 the software automatically determines the location of the original image document on the platen 58 and derives the proper high resolution scan area for the image (final scan), and executes the final scan 20 automatically. If the user did not select auto crop 54, 60, the user is directed to select the area to be finally scanned from the preview, e.g. by a mouse directed lasso utility. Then the user presses the "scan button" 18, either a hardware button on the scanner or a software clickable button on screen, and the scanner rescans/acquires the defined image area 20 at high resolution, typically 300+ dpi. This acquired image 20 is then typically stored in memory.

Continuing with the prior art process in FIG. 2, the upper portion FIG. 2A illustrates the scanner system 10 having platen aperture 12 on which is placed the image document to be scanned 14, and around which is the blank, white area 16, as in FIG. 1. The scan bar 24 has an initial or "Start" position 26 at the Top of the platen 28. The bar moves downwardly during scan 30 to the end scan position at the bottom of the platen 34, after which it returns 36 to the top, start position 26 for the next step of the process.

The lower portion, FIG. 2B, shows on the left side, the start of preview/auto crop scan 50 for image $I_n$, the acquisition of the preview, low resolution image 52, the determination of the location of the image for auto-cropping 58, the acquisition of the high resolution image 20, followed by the storage of image $I_n$ in high resolution 22, followed by the loop back, 80, to the start condition 30 for new image $I_{n+1}$. The corresponding position of scan head 24 is shown just to the right of the flow sheet for image $I_n$, with the head starting at the top 28, scanning 30 at preview scan speed to the bottom 34 during previewing 52 in Pass 1, returning to the top 28 without scanning at return speed in Pass 2, full resolution scanning 30 at high resolution scan speed from top 28 to bottom 34 in Pass 3, and returning again to the top 28 without scanning at return speed in Pass 4, which readies the scanner for image $I_{n+1}$. The 4-Pass time is about 52 seconds for this first 8½×11" image document. For the second, third, etc., images the time is the same for each, that is n images×52 seconds.

In summary, the 4 prior art steps and motions of the scanner bar are:

Image 1:

Pass 1), Top to Bottom: Preview image, 72-100 dpi at preview bar speed;

User selects crop; a) Manual; or b) Auto Crop out White (this may be selected before Pass 1);

Pass 2), Bottom to Top: Scanner bar returns to start position at return speed without scanning;

User selects "Scan" and presses or clicks "Button";

Pass 3), Top to Bottom: Rescan at high resolution, typically, 300+ dpi at slower high-resolution speed; and Pass 4), Bottom to Top: Scanner bar returns to start position at return speed.

Image 2:

Repeat Passes 1) through 4).

Nth Image:

Repeat Passes 1) through 4).

Figure 3:
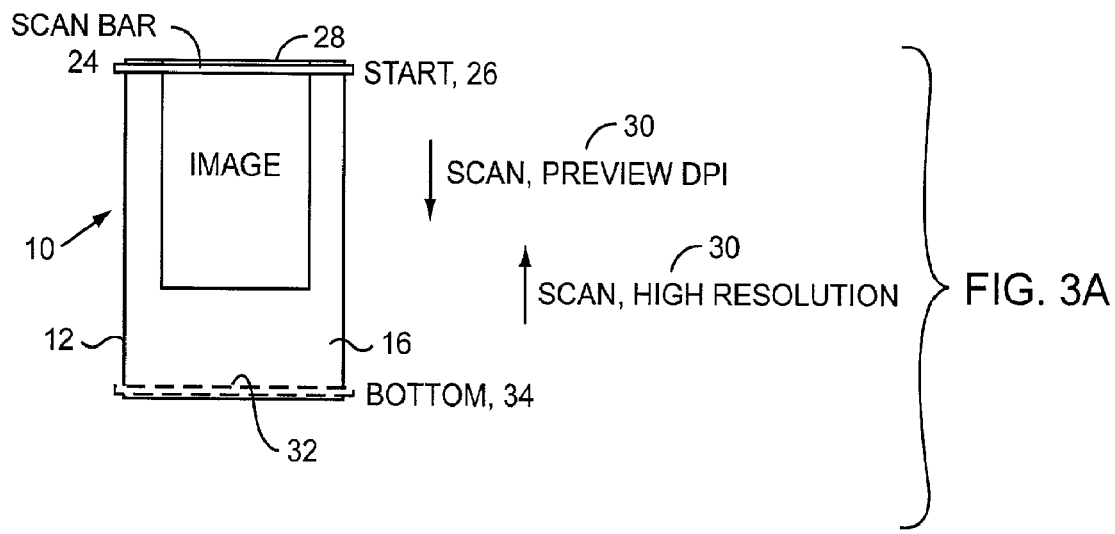
Figure 3:
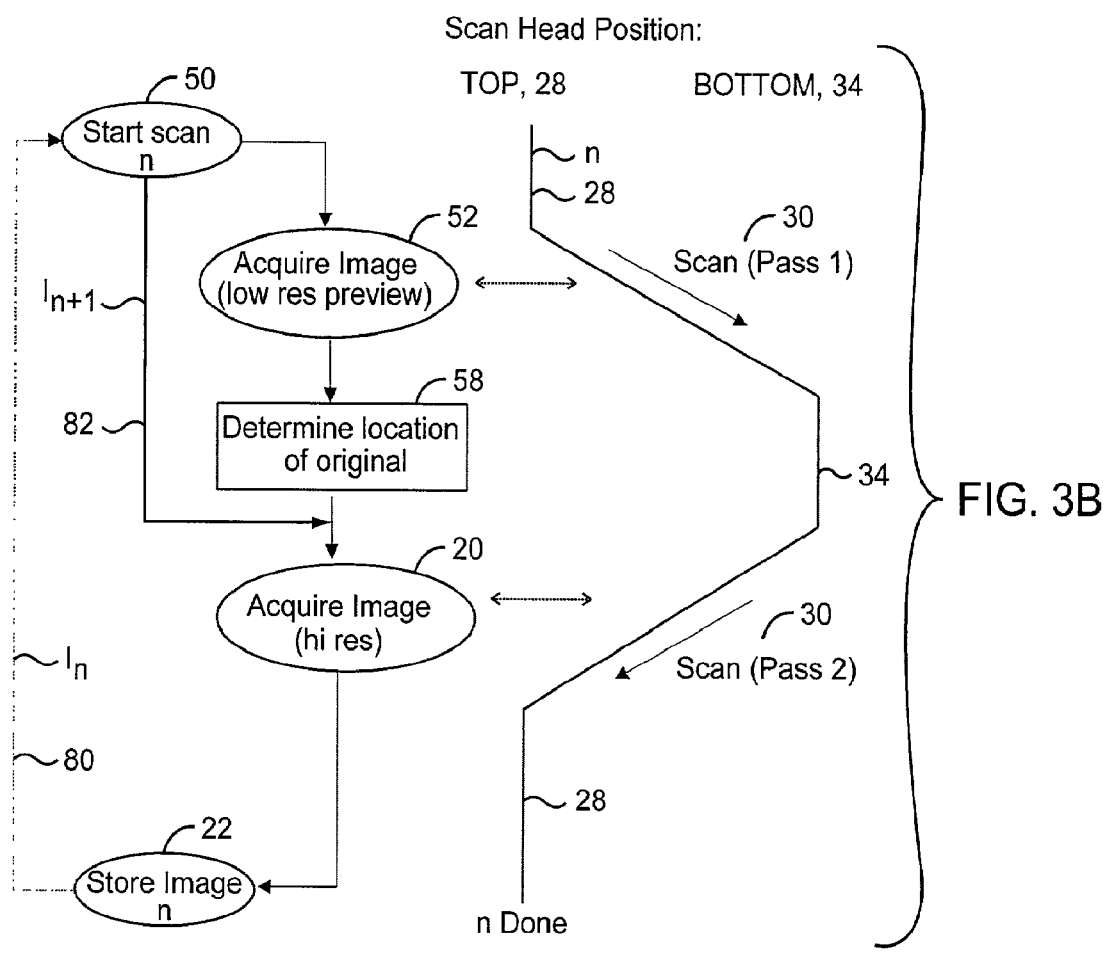

In contrast, in the present invention as shown in FIGS. 3A and 3B, the scan bar 24 of the inventive scanner 10 makes a standard, low resolution scan 52 on its first pass 30, Pass 1. The software system of the invention transmits the collected image data to an attached computer or display to allow the user to view the preview scan. The software system of the invention automatically crops the image 58, and on the return pass 30 of the scanner bar, Pass 2, creates a high-resolution image 20 of just the area selected by the cropping algorithms. Both of the non-scanning return passes 36 of the conventional scanner of FIG. 2B are eliminated. In the above example, the present invention provides a reduction of 15 seconds, to about 37 seconds, which is over a 40% time reduction. Depending on the resolution and rate of return, the reduction can range from about 20% to 100%, and typically, 3 to 7 images can be scanned at high resolution in the time it ordinarily takes to scan two images in a conventional scanner.

Even more striking, as seen in FIG. 3B, where there are multiple same-sized images to scan, e.g., multiple image documents of the same size, the inventive system follows the path 82 for image $I_{n+2}$, and subsequent images. That is, one image is scanned at high resolution for each pass of the scanner head 24, for even greater time savings.

Note that FIGS. 3A and 3B illustrate the functionality of the inventive system and details of the operational hardware and firmware operations that programmers skilled in the art will recognize as adequate disclosure for use to write appropriate software code to realize the inventive hardware operation and process step functionality.

It should be understood that although the image document 14 is shown being placed in the center, top of the platen 12, it is ordinarily placed in the upper right hand corner of the platen. The scanner software, e.g., "One Touch" scanner software from Visioneer, Inc. of Pleasanton Calif., which is hereby incorporated by reference, will let the user know when the document is not placed in that position by a pop-up warning notice "Original not placed properly" which instructs the user to align the original as shown in a diagram so the original will be scanned straight. Further, the software can be enabled with a pop-up notice that the scanner is waiting for the next document to scan, and such notice can include a count of pages previously scanned. This pop-up notice can offer instructions for continued scanning, and a menu of software clickable buttons can be provided, such as "Done Scanning", "Scan Next" or "Cancel All", to facilitate use.

INDUSTRIAL APPLICATION

It is clear that the system of the invention comprising a digital image acquisition device that sends high resolution image data to a computer more quickly than possible today will have wide industrial application, among others for small office, home office, and personal use. An important aspect of the invention is that since the number of passes is cut in half or less, the effective scan motor usage is also reduced, meaning the life of the scanner mechanicals is extended, and the mean time between failure is extended.

Because the system allows the user to import images as digital data onto a computer, the apparatus and software system will work where users need images without long delays. The productivity gains are particularly in cases of multiple and/or high volume image scanning. Once scanned, the user can process the image by computer, by e-mail, editing, archiving, copying, printing, or sending images for professional processing and printing.

It should be understood that one skilled in the art can make modifications and adaptations of the hardware or system elements within the scope of this invention without departing from the spirit thereof. It is therefore wished that this invention be defined by the scope of the forthcoming claims as broadly as the prior art will permit, and in view of the specification if need be.

The invention claimed is:

1. A digital scanner for use with a document having an image, comprising a platen adapted to receive the document, a scanner bar moveable from top to bottom in a forward scanner bar pass and back from bottom to top in a return scanner bar pass, and firmware and software configured to initiate a preview, low resolution scan in the forward scanner bar pass and a high resolution scan in the return scanner bar pass in an aggregate time of about 37 seconds to store the image of the document, the firmware and software being additionally configured to provide an auto crop mode to preview and auto crop the image in the forward scanner bar pass and acquire a high resolution cropped image in the return scanner bar pass without pause for user initiation of final scan after said forward scanner bar pass, and to auto-crop and scan an additional image at high resolution in an additional forward scanner bar pass.

2. A digital scanner as in claim 1 wherein the firmware and software auto crop and scan an additional image at high resolution in each subsequent scanner bar pass.

3. Method of operation of a digital scanner having a platen for receipt of a document having an image to be scanned, a scanner bar moveable from top to bottom in a forward scanner bar pass and from bottom to top in a return scanner bar pass and firmware and software for operation of the scanner and for selection, cropping, editing, management and storage of acquired images, comprising scanning the image in a preview and low resolution scan mode in the forward scanner bar pass and scanning the image in a high resolution mode in the return scanner bar pass, the scanning of the image in the forward scanner bar pass and in the return scanner bar pass aggregating about 37 seconds, selectively auto cropping the image in the forward scanner bar pass, acquiring a high resolution cropped image in the return scanner bar pass without pause for user initiation of final scan after the forward scanner bar pass, and auto cropping and scanning at high resolution an additional image in an additional forward scanner bar pass.

4. Method of scanning as in claim 3 which includes the step of auto cropping and scanning an additional image at high resolution in each subsequent scanner bar pass.

5. A method of scanning an image in a document, comprising:
- scanning the image at low resolution in a forward scanner bar pass to provide a scanned image;
- auto-cropping the scanned image to provide a cropped image;
- scanning the cropped image in a return scanner bar pass to create a high resolution image;
- wherein the aggregate time to complete the scanning and auto-cropping steps is about 37 seconds; and
- auto-cropping and scanning an additional image at high resolution in each subsequent scanner bar pass.

6. A digital scanner for use with a document having an image comprising:
- a platen adapted to receive the document;
- a scanner bar moveable relative to the platen from top to bottom in a low resolution scan mode first pass and from bottom to top in a high resolution image acquisition scan mode second pass; and
- firmware and software for operation of the scanner and for selection, cropping, editing, management and storage of the image and for completing the low resolution scan mode and the high resolution image acquisition scan mode in about 37 seconds.

7. The digital scanner of claim 6 wherein the firmware and software provide a cropped image from the low resolution scan mode for use in the high resolution image acquisition scan mode.

8. The digital scanner of claim 6 wherein the firmware and software provide an auto-cropping mode.

9. A digital scanner for use with a document having an image comprising:
- a platen adapted to receive the document;
- a scanner bar moveable relative to the platen from top to bottom in a low resolution scan mode first pass and from bottom to top in a high resolution image acquisition scan mode second pass; and
- firmware and software for operation of the scanner and for selection, cropping, editing, management and storage of the image and for completing the low resolution scan mode and the high resolution image acquisition scan mode in about 37 seconds, the firmware and software being configured to provide a cropped image from the low resolution scan mode for use in the high resolution image acquisition scan mode, to provide an auto-cropping mode and to auto-crop and scan an additional image at high resolution in an additional top to bottom pass.

10. A digital scanner for use with a document having an image comprising:
- a platen adapted to receive the document;
- a scanner bar moveable relative to the platen from top to bottom in a low resolution scan mode first pass and from bottom to top in a high resolution image acquisition scan mode second pass; and
- firmware and software for operation of the scanner and for selection, cropping, editing, management and storage of the image and for completing the low resolution scan mode and the high resolution image acquisition scan mode in about 37 seconds, the firmware and software configured to provide a cropped image from the low resolution scan mode for use in the high resolution image acquisition scan mode, to provide an auto-cropping mode and to auto-crop and scan an additional image at high resolution in each subsequent pass.

\* \* \* \* \*